(12) United States Patent
Saga et al.

(10) Patent No.: US 7,939,975 B2
(45) Date of Patent: May 10, 2011

(54) OVER-MOLD STATOR ASSEMBLY AND PROCESS FOR PREPARATION THEREOF

(75) Inventors: Yuji Saga, Tochigi (JP); Masahiro Matsuzaki, Tochigi (JP); Yoko Matsuzaki, legal representative, Kawasaki (JP)

(73) Assignee: E. I du Pont de Nemours and Company, Wilmington, DE (US)

( * ) Notice: Subject to any disclaimer, the term of this patent is extended or adjusted under 35 U.S.C. 154(b) by 133 days.

(21) Appl. No.: 12/288,895

(22) Filed: Oct. 23, 2008

(65) Prior Publication Data
US 2009/0167101 A1  Jul. 2, 2009

Related U.S. Application Data

(60) Provisional application No. 61/000,547, filed on Oct. 26, 2007.

(51) Int. Cl.
*H02K 1/04* (2006.01)
(52) U.S. Cl. .......................................................... 310/43
(58) Field of Classification Search .................. 310/43, 310/64, 216.001–216.137, 214, 215, 194
See application file for complete search history.

(56) References Cited

U.S. PATENT DOCUMENTS

| | | | |
|---|---|---|---|
| 4,118,372 A | 10/1978 | Schaefgen | |
| 4,174,358 A | 11/1979 | Epstein | |
| 4,578,852 A * | 4/1986 | Sauerwein et al. | 29/596 |
| 4,753,980 A | 6/1988 | Deyrup | |
| 6,300,695 B1 | 10/2001 | Neal | |
| 6,362,554 B1 | 3/2002 | Neal | |
| 6,427,464 B1 | 8/2002 | Beaverson | |
| 6,509,665 B1 | 1/2003 | Nishiyama | |
| 6,600,633 B2 | 7/2003 | Macpherson | |
| 6,617,721 B1 | 9/2003 | Neal | |
| 6,753,628 B1 | 6/2004 | Neal | |
| 6,756,709 B2 * | 6/2004 | Kobayashi et al. | 310/43 |
| 6,844,636 B2 | 1/2005 | Lieu | |
| 6,892,439 B1 | 5/2005 | Neal | |
| 6,941,640 B2 | 9/2005 | Neal | |
| 7,019,422 B2 | 3/2006 | Neal | |
| 7,036,207 B2 | 5/2006 | Neal | |
| 7,049,715 B2 | 5/2006 | Neal | |
| 7,067,952 B2 | 6/2006 | Neal | |
| 2004/0183385 A1* | 9/2004 | Takahashi et al. | 310/68 D |
| 2005/0082919 A1 | 4/2005 | Neal | |
| 2006/0238063 A1 | 10/2006 | Neal | |

FOREIGN PATENT DOCUMENTS

| | | |
|---|---|---|
| WO | WO01/10002 | 2/2001 |
| WO | WO/01/45233 | 6/2001 |

* cited by examiner

*Primary Examiner* — Nguyen N Hanh

(57) ABSTRACT

A stator assembly and a method for making a stator assembly wherein the stator assembly is over-molded with thermally conductive and electrically insulating polymer composition. The stator core of the stator assembly is coated with adhesive component to provide higher heat transfer at the interface of stator core and over-molded insulator and coil.

7 Claims, 3 Drawing Sheets

OVER-MOLD STATOR ASSEMBLY AND PROCESS FOR PREPARATION THEREOF

CROSS REFERENCE TO RELATED APPLICATIONS

This application claims the benefit of U.S. Provisional Application No. 61/000,547, filed Oct. 26, 2007.

FIELD OF THE INVENTION

The present invention relates to a stator assembly in which the surface of the stator core of the assembly is coated with an adhesive component and then over-molded with a thermally conductive polymer composition as an insulator.

BACKGROUND OF THE INVENTION

Motors having a rotor and stator assembly are used in home appliances, industrial equipment, computer disc drives and hybrid electric vehicles.

Two types of stator assemblies have been available for use in motors or generators depending on the way the wire coil is wound on the stator, i.e., one is a distributed coil stator assembly and the other is a concentrated coil stator assembly. The concentrated coil stator assembly has the advantage of utilizing a shorten coil end, thereby downsizing the motor. The shortened coil of this stator assembly reduces the copper loss generated by wire-wound-coil and forms a highly efficient motor or generator.

A number of cooling methods have been used to cool motors and generators, e.g., dissipating fins on a frame arranged around the stator rim to substantially cool the surface area, a forced air cooling system using a fan, or a liquid cooling system that uses a cooling-liquid-path provided to a frame. Other cooling systems have also been used, e.g., cooling the core coils directly in a motor or generator with oil or dissipating the heat inside a motor through a heat-pipe to the outside. However, since these methods cool the inside of motor or generator directly, the number of components inevitably increases, which makes the motor or generator structure complicated, and thus, produces another problem, such as, maintaining the reliability of the motor or generator.

The coil of the stator assembly which is a heat source is electrically insulated on its surface so that the coil can carry electric current. An insulator or an insulating paper is disposed between the coil and an iron core of the stator assembly that is made of electromagnetic steel sheets in order to prevent the coil from being peeled off its sheath or broken by the edges of the iron core when the wires are coiled. The insulating paper generally is an aramid paper. The above discussion describes in general the structures of the motor-coil.

These insulators and insulating papers are electrical insulating materials and at the same time, they are heat insulators and thus block heat conduction. For instance, the aramid paper's heat conductivity is as low as 0.14 W/mK.

A highly heat-conductive resin can be disposed between the coil and the iron core of the stator assembly to efficiently dissipate the heat from the motor. This arrangement increases heat-dissipation-efficiency, but it also increases the motor's weight and becomes a critical problem particularly in a motor for an electric vehicle. Such a motor needs to be downsized and a greater output at higher efficiency is demanded. Further, this arrangement requires equipment and a process for potting the heat conductive resin. Reliability of the motor must be maintained to avoid an electrical breakdown of coils due to shorting out of wires and depends on the pressure and/or temperature used during resin potting.

If the material of an insulator is changed to a higher heat-conductive material, the following problem occurs: In a process of winding a wire on a core, the wire requires some tension, otherwise, the wire becomes loose, and the wire can not be wound correctly within a slot of the core. The insulator material needs to have at least a sufficient level of strength to withstand this tension. On the other hand, an electrical insulator of high heat conductivity, such as, silicone rubber or synthetic resin containing aluminum oxide of excellent heat-conductivity is well known but is soft and fragile and thus has poor strength and is not useful as an insulator for the coil. Also, if the motor is exposed to thermal cycles and thermal shock, the interface between the coil insulator and core can delaminate due to the difference of coefficient of linear thermal expansion. If a de-lamination at the interface exists, heat transfer is drastically restricted by the presence of air which has low thermal conductivity at 0.02 W/mK.

To address this problem, plastic compositions having improved thermally conductive properties have been developed. Neal, U.S. Pat. No. 6,362,554 discloses a method of encapsulating a high speed spindle motor that includes a core and a stator having multiple conductors. These conductors create magnetic fields as they conduct electrical current. A thermally-conductive body encapsulates the stator. The '554 Patent discloses that a thermally-conductive, but non-electrically-conductive, plastic composition including filler particles can be used to form the encapsulating body. According to the '554 Patent, a preferred form of plastic is polyphenyl sulfide, and the amount and type of filler can be a ceramic material, glass, Kevlar® aramid fiber from E. I. DuPont de Nemours and Company, carbon fibers or other fibers.

U.S. Pat. No. 6,600,633 (Macpherson, et al.) discloses a thermally conductive over-mold for a disc drive actuator assembly but does not recognize the advantage of coating a stator core with an adhesive component.

U.S. Pat. No. 6,509,665 (Nishiyama, et al.) discloses a motor having stator with insulator of high heat conductivity but there is no indication of the advantage of coating a stator core with an adhesive component.

U.S. Pat. No. 7,077,990 (Miller) discloses high density, thermally conductive plastic compositions for encapsulating motors but there is no indication of the advantage of coating a stator core with an adhesive component.

Although the use of such thermally-conductive plastic compositions can be somewhat effective in transferring heat away from the stator assembly compared to using a general plastic compositions, there is a need of further improvements to provide heat transfer between the stator core and the over-molded plastic. An adhesive component intervening between the stator core and the over-mold of a thermally conductive resin can improve heat transfer between them that leads to efficient heat release from the stator assembly.

The present invention provides such a stator assembly over-molded with a thermally conductive polymer composition that has an adhesive component at the interface between the polymer composition and the stator core to improve heat transfer.

SUMMARY OF THE INVENTION

A stator assembling comprising:
(a) a stator core comprising laminated electromagnetic steel sheets and wire wound coils;
(b) an over-molded insulator covering the stator core and being positioned between the stator core and the wire wound coils; wherein the over-molded insulator comprises a thermally conductive polymer composition having a thermal conductivity of at least about 0.6 W/mK; and (c) an adhesive component interfaced between the stator core a) and the over-molded insulator (b).

In a further embodiment, the invention comprises the adhesive component c) which is a primer coated on the stator core.

In a still further embodiment, the invention comprises a primer containing a coupling agent selected from the group consisting of silane, titanate, zirconate, aluminate, zircoaluminate.

In yet still a further embodiment, the invention comprises a thermally conductive polymer composition wherein the polymer has groups which are reactive with the coupling agents.

In yet another embodiment, the invention comprises a motor comprising the stator assembly.

In still yet another embodiment, the invention comprises a generator comprising the stator assembly.

A process for making the stator assembly also is part of this invention.

DETAILED DESCRIPTION OF THE INVENTION

The present invention relates to a stator assembly having an over-molded insulator of a thermally-conductive polymer composition covering the core of the stator assembly and an adhesive component interfaced between the stator core and the thermally conductive polymer composition. The present invention provides a stator assembly having a high heat dissipation performance by utilizing an adhesive component that is positioned at the interface between the stator core and the thermally conductive polymer composition that forms the over-molding.

Figure 1:
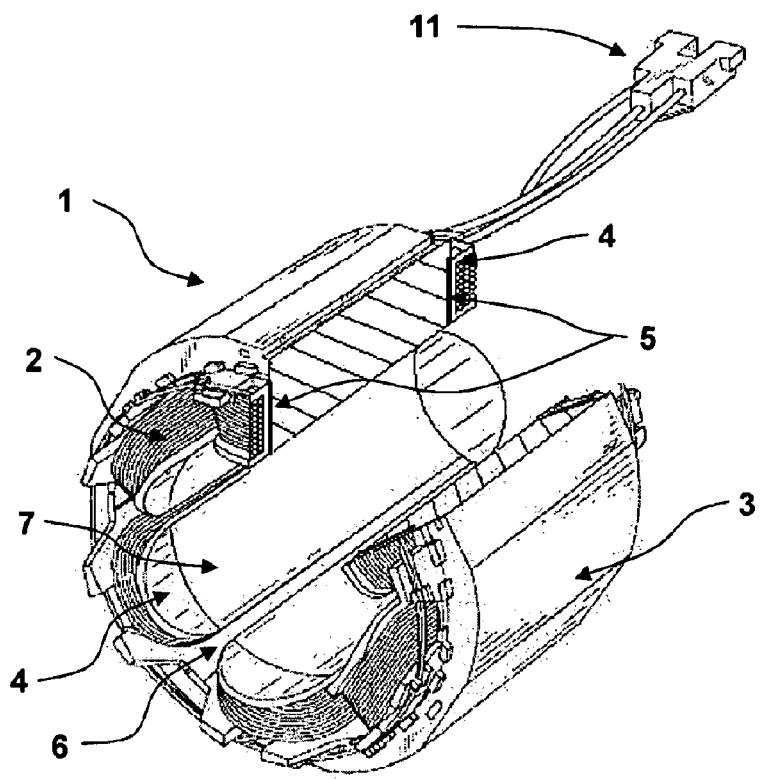
FIG. 1 is an exploded perspective view of stator assembly.

FIG. 1 shows a stator assembly 1 that includes a laminated steel core 3, coil windings 2 positioned in relation to the steel core 3, an over-molded insulator 4 covering the coil windings 2 and an adhesive component layer 5 positioned between the steel core 3 and the over-molded insulator 4 and an electrical connector assembly 11. The coil windings 2 are positioned on tooth 7 of the stator assembly. Slot 6 is positioned between coil windings 2.

Figure 2:
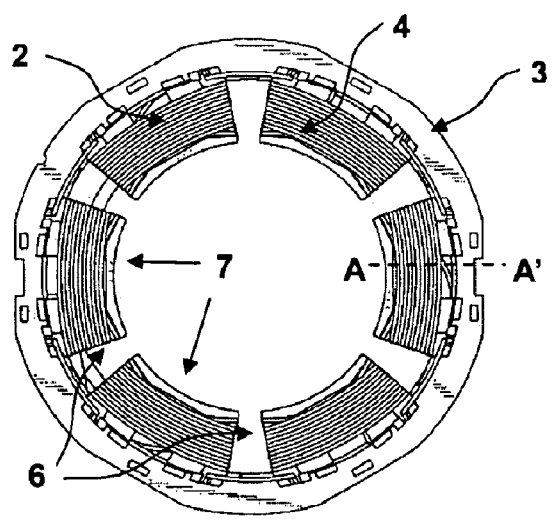
FIG. 2 is a front perspective view of the stator assembly.

FIG. 2 is a front perspective view of the stator assembly of FIG. 1 that shows the laminated steel core 3, coil windings 2, the over-molded insulator 4 adjacent to the coil windings 2, slots 6 between the coil windings 2 and teeth 7 adjacent to the coil windings 2.

Figure 3:
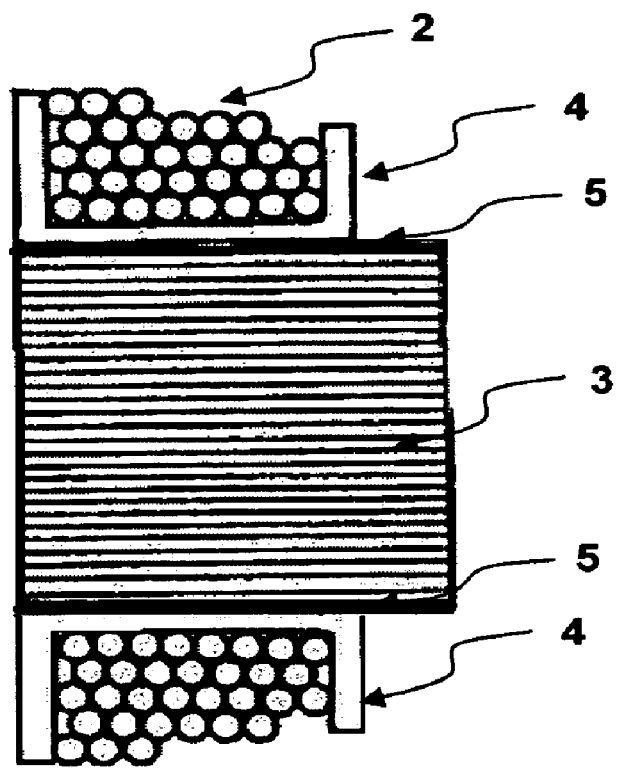
FIG. 3 is an upper cross section of the perspective view of the stator assembly at A-A'.

FIG. 3 shows a cross section of the stator assembly of FIG. 1 taken at A-A' (FIG. 2). The cross section of the coil winding 2 is shown with the over-molded insulator 4 and an adhesive component layer 5 is at the interface of the insulator 4 and the laminated steel core 3.

Thermally Conductive Polymer Composition

The thermally conductive polymer composition used to form the over-molded insulator for the stator assembly of this invention is electrically insulating and thermally conductive and comprises a base polymer and a thermally conductive filler material and has a thermal conductivity of at least about 0.6 W/mk and up to about 100 W/mk and preferably, at least about 0.6 W/mk and up to about 10 W/mk and more preferably, from 0.6 W/mk to 5 W/mk. Preferably, the thermally conductive polymer composition comprises about 10 to 80 volume percent of the base polymer and about 90 to 20 volume percent of the thermally conductive filler material and more preferably about 30 to 70 volume percent of the base polymer and 70 to 30 volume percent of the thermally conductive filler material. It is desirable to provide a thermally conductive polymer composition that has a high conductivity but this must be balanced with the moldability of the composition and the costs of the conductive filler materials.

A variety of thermoplastic and thermosetting polymers can be used as the base polymer to form the thermally conductive polymer composition. For example, useful thermoplastic polymers can be selected from the following group of polymers: polycarbonate, polyethylene, polypropylene, acrylics, vinyls, injection moldable fluoropolymers (PFA), polyamides, polyesters, polysulfones, polyphenylene sulfide, liquid crystal polymers, such as, thermoplastic aromatic polyesters, polyetherimides, polyamidimides, and blends thereof. Alternatively, thermosetting polymers, such as, elastomers, epoxies, polyimides, silicones, unsaturated polyester and polyurethanes can be used. Polymers having groups, such as, carboxy, amino, epoxy, hydroxyl, and acid anhydride which can react with the adhesive components are preferred.

Preferred base polymers for the thermally conductive polymer composition are thermoplastic polymers and more preferred are polyesters, polyamide and liquid crystal polymers.

Preferred thermoplastic polyesters include polyesters having an inherent viscosity of 0.3 or greater and that are, in general, linear saturated condensation products of diols and dicarboxylic acids, or reactive derivatives thereof. Preferably, these polyesters are the condensation products of aromatic dicarboxylic acids having 8 to 14 carbon atoms and at least one diol selected from the group consisting of neopentyl glycol, cyclohexanedimethanol, 2,2-dimethyl-1,3-propane diol and aliphatic glycols of the formula $HO(CH_2)_nOH$ where n is an integer of 2 to 10. Up to 20 mole percent of the diol may be an aromatic diol such as, ethoxylated bisphenol A, sold as Dianol® 220 by Akzo Nobel Chemicals, Inc.; hydroquinone; biphenol; or bisphenol A. Up to 50 mole percent of the aromatic dicarboxylic acids can be replaced by at least one different aromatic dicarboxylic acid having from 8 to 14 carbon atoms, and/or up to 20 mole percent can be replaced by an aliphatic dicarboxylic acid having from 2 to 12 carbon atoms. Copolymers may be prepared from two or more diols or reactive equivalents thereof and at least one dicarboxylic acid or reactive equivalent thereof or two or more dicarboxylic acids or reactive equivalents thereof and at least one diol or reactive equivalent thereof. Difunctional hydroxy acid monomers such as hydroxybenzoic acid or hydroxynaphthoic acid or their reactive equivalents may also be used as comonomers.

Preferred polyesters include poly(ethylene terephthalate) (PET), poly(1,4-butylene terephthalate) (PBT), poly(propylene terephthalate) (PPT), poly(1,4-butylene naphthalate) (PBN), poly(ethylene naphthalate) (PEN), poly(1,4-cyclohexylene dimethylene terephthalate) (PCT), and copolymers and mixtures of the foregoing. Also, preferred are 1,4-cyclohexylene dimethylene terephthalate/isophthalate copolymer and other linear homopolymer esters derived from aromatic dicarboxylic acids, including isophthalic acid; bibenzoic acid; naphthalenedicarboxylic acids including the 1,5-; 2,6-; and 2,7-naphthalenedicarboxylic acids; 4,4'-diphenylenedicarboxylic acid; bis(p-carboxyphenyl) methane; ethylene-bis-p-benzoic acid; 1,4-tetramethylene bis(p-oxybenzoic) acid; ethylene bis(p-oxybenzoic) acid; 1,3-trimethylene bis (p-oxybenzoic) acid; and 1,4-tetramethylene bis(p-oxybenzoic) acid, and glycols selected from the group consisting of 2,2-dimethyl-1,3-propane diol; neopentyl glycol; cyclohexane dimethanol; and aliphatic glycols of the general formula $HO(CH_2)_nOH$ where n is an integer from 2 to 10, e.g., ethylene glycol; 1,3-trimethylene glycol; 1,4-tetramethylene glycol; -1,6-hexamethylene glycol; 1,8-octamethylene glycol; 1,10-decamethylene glycol; 1,3-propylene glycol; and 1,4-butylene glycol. Up to 20 mole percent, as indicated above, of one or more aliphatic acids, including adipic, sebacic, azelaic, dodecanedioic acid or 1,4-cyclohexanedicarboxylic acid can be present. Also preferred are copolymers derived from 1,4-butanediol, ethoxylated bisphenol A, and terephthalic acid or reactive equivalents thereof. Also preferred are random copolymers of at least two of PET, PBT, and PPT, and mixtures of at least two of PET, PBT, and PPT, and mixtures of any of the forgoing.

The thermoplastic polyester may also be in the form of copolymers that contain poly(alkylene oxide) soft segments. The poly(alkylene oxide) segments are to be present in about 1 to about 15 parts by weight per 100 parts by weight of thermoplastic polyester. The poly(alkylene oxide) segments have a number average molecular weight in the range of about 200 to about 3,250 or, preferably, in the range of about 600 to about 1,500. Preferred copolymers contain poly(ethylene oxide) incorporated into a PET or PBT chain. Methods of incorporation are known to those skilled in the art and can include using the poly(alkylene oxide) soft segment as a comonomer during the polymerization reaction to form the polyester. PET may be blended with copolymers of PBT and at least one poly(alkylene oxide). A poly(alkyene oxide) may also be blended with a PET/PBT copolymer. The inclusion of a poly(alkylene oxide) soft segment into the polyester portion of the composition may accelerate the rate of crystallization of the polyester.

More preferred polyamides include polyamide 6, polyamide 66, polyamide 612, polyamide 610, or other aliphatic polyamides and semi-aromatic polyamides, such as those derived from terephthalic acid and/or isophthalic acid. Examples include polyamides 6T66, 6TDT, 9T, 10T, 12T, polyamides derived from hexamethylenediamine, adipic acid, and terephthalic acid; and polyamides derived from hexamethylenediamine, 2-methylpentamethylenediamine, and terephthalic acid. Blends of two or more polyamides may be used.

By a "liquid crystalline polymer" (abbreviated "LCP") is meant a polymer that is anisotropic when tested using the TOT test or any reasonable variation thereof, as described in U.S. Pat. No. 4,118,372, which is hereby included by reference. Useful LCP's include polyesters, poly(ester-amides), and poly(ester-imides). One preferred form of LCP is "all aromatic", that is all of the groups in the polymer main chain are aromatic (except for the linking groups such as ester groups), but side groups which are not aromatic may be present.

The thermally conductive polymer composition can include polymeric toughening agent as a component in the present invention.

When the thermoplastic polymer is a polyester, the toughening agent will typically be an elastomer or has a relatively low melting point, generally <200° C., preferably <150° C. and that has attached to it functional groups that can react with the thermoplastic polyester (and optionally, other polymers present). Since thermoplastic polyesters usually have carboxyl and hydroxyl groups present, these functional groups usually can react with carboxyl and/or hydroxyl groups. Examples of such functional groups include epoxy, carboxylic anhydride, hydroxyl (alcohol), carboxyl, and isocyanate. Preferred functional groups are epoxy, and carboxylic anhydride, and epoxy is especially preferred. Such functional groups are usually "attached" to the polymeric toughening agent by grafting small molecules onto an already existing polymer or by copolymerizing a monomer containing the desired functional group when the polymeric tougher molecules are made by copolymerization. As an example of grafting, maleic anhydride may be grafted onto a hydrocarbon rubber using free radical grafting techniques. The resulting grafted polymer has carboxylic anhydride and/or carboxyl groups attached to it. An example of a polymeric toughening agent wherein the functional groups are copolymerized into the polymer is a copolymer of ethylene and a (meth)acrylate monomer containing the appropriate functional group.

By (meth)acrylate herein is meant the compound may be either an acrylate, a methacrylate, or a mixture of the two. Useful (meth)acrylate functional compounds include (meth) acrylic acid, 2-hydroxyethyl (meth)acrylate, glycidyl (meth) acrylate, and 2-isocyanatoethyl (meth)acrylate. In addition to ethylene and a functional (meth)acrylate monomer, other monomers may be copolymerized into such a polymer, such as vinyl acetate, unfunctionalized (meth)acrylate esters, such as, ethyl (meth)acrylate, n-butyl(meth)acrylate, and cyclohexyl(meth)acrylate. Preferred toughening agents include those listed in U.S. Pat. No. 4,753,980, which is hereby included by reference. Especially preferred toughening agents are copolymers of ethylene, ethyl acrylate or n-butyl acrylate, and glycidyl methacrylate.

It is preferred that the polymeric toughening agent used with thermoplastic polyesters contain about 0.5 to about 20 weight percent of monomers containing functional groups, preferably about 1.0 to about 15 weight percent, more preferably about 7 to about 13 weight percent of monomers containing functional groups. There may be more than one type of functional monomer present in the polymeric toughening agent. It has been found that toughness of the composition is increased by increasing the amount of polymeric toughening agent and/or the amount of functional groups. However, these amounts should preferably not be increased to the point that the composition may crosslink, especially before the final part shape is attained.

The polymeric toughening agent used with thermoplastic polyesters may also be thermoplastic acrylic polymers that are not copolymers of ethylene. The thermoplastic acrylic polymers are made by polymerizing acrylic acid, acrylate esters (such as, methyl acrylate, n-propyl acrylate, isopropyl acrylate, n-butyl acrylate, n-hexyl acrylate, and n-octyl acrylate), methacrylic acid, and methacrylate esters (such as, methyl methacrylate, n-propyl methacrylate, isopropyl methacrylate, n-butyl methacrylate, isobutyl methacrylate, n-amyl methacrylate, n-octyl methacrylate, glycidyl methacrylate (GMA) and the like). Copolymers derived from two or more of the forgoing types of monomers may also be used, as well as copolymers made by polymerizing one or more of the forgoing types of monomers with styrene, acryonitrile, butadiene, isoprene, and the like. Part or all of the components in these copolymers should preferably have a glass transition temperature of not higher than 0° C. Preferred monomers for the preparation of a thermoplastic acrylic polymer toughening agent are methyl acrylate, n-propyl acrylate, isopropyl acrylate, n-butyl acrylate, n-hexyl acrylate, and n-octyl acrylate.

It is preferred that a thermoplastic acrylic polymer toughening agent have a core-shell structure. The core-shell structure is one in which the core portion preferably has a glass transition temperature of 0° C. or less, while the shell portion is preferably has a glass transition temperature higher than that of the core portion. The core portion may be grafted with silicone. The shell section may be grafted with a low surface energy substrate such as silicone, fluorine, and the like. An acrylic polymer with a core-shell structure that has low surface energy substrates grafted to the surface will aggregate with itself during or after mixing with the thermoplastic polyester and other components of the composition of the invention and can be easily uniformly dispersed in the composition.

Suitable toughening agents for polyamides are described in U.S. Pat. No. 4,174,358. Preferred toughening agents include polyolefins modified with a compatibilizing agent, such as, an acid anhydride, dicarboxylic acid or derivative thereof, carboxylic acid or derivative thereof, and/or an epoxy group. The compatibilizing agent may be introduced by grafting an unsaturated acid anhydride, dicarboxylic acid or derivative thereof, carboxylic acid or derivative thereof, and/or an epoxy group to a polyolefin. The compatibilizing agent may also be introduced while the polyolefin is being made by copolymerizing with monomers containing an unsaturated acid anhydride, dicarboxylic acid or derivative thereof, carboxylic acid or derivative thereof, and/or an epoxy group. The compatibilizing agent preferably contains from 3 to 20 carbon atoms. Examples of typical compounds that may be grafted to (or used as comonomers to make) a polyolefin are acrylic acid, methacrylic acid, maleic acid, fumaric acid, itaconic acid, crotonic acid, citrconic acid, maleic anhydride, itaconic anhydride, crotonic anhydride and citraconic anhydride.

When used, the polymeric toughening agent will preferably be present in about 0.5 to about 30 volume percent, or more preferably in about 1 to about 20 volume percent, based on the total volume of the composition.

In the present invention, thermally-conductive filler material is added to the base polymer to form the thermally conductive polymer composition. These filler materials impart thermal conductivity to the non-conductive base polymer. Examples include ceramic powders, including aluminum oxide, magnesium oxide, boron nitride, aluminum nitride, silicon nitride, calcium fluoride, zinc oxide, glass fibers, and ceramic fibers, such as, alumina fibers, calcium titanate fibers, and silicon nitride fibers.

The thermally-conductive filler material can be in the form of particles, granular powder, whiskers, fibers, or any other suitable form. The particles or granules can have a variety of structures and a broad particle size distribution. For example, the particles or granules can have flake, plate, rice, strand, hexagonal, or spherical-like shapes with a particle size up to about 200 microns. As another example, the fibers can have a length up to about 3 millimeters.

The surface of the thermally conductive filler material can be modified with a chemical agent having groups which can react with the polymer composition. For example, coupling agents, such as, silane, titanate, zirconate, aluminate and zircoaluminate can be used for the modification of the thermally conductive filler materials. Typically, about 0.5 wt. % to about 5.0 wt. %, based on the thermally conductive filler material, of the coupling agent is used.

An optional reinforcing material can be added to the thermally conductive polymer composition. The reinforcing material can be glass, inorganic minerals, or other suitable strengthening material. The reinforcing material strengthens the polymer composition. The reinforcing material, if added, constitutes about 3% to about 25% by volume of the composition.

Further, electrically-conductive materials in small amounts (about 1% to about 10% based) based on volume of the composition can be added to increase thermal conductivity. However, it is important that the total electrical resistivity of the composition be kept at $10^{14}$ ohm-cm or greater. For example, copper, copper alloys, such as, copper-tin, and graphite can be added.

The thermally conductive polymer composition optionally may include one or more plasticizers, nucleating agents, flame retardants, flame retardant synergists, heat stabilizers, antioxidants, dyes, pigments, mold release agents, lubricants, UV stabilizers, adhesion promoters and the like.

The thermally conductive polymer compositions used in the present invention are in the form of a melt-mixed or a solution-mixed blend, wherein all of the polymeric components are well-dispersed within each other and all of the non-polymeric ingredients are homogeneously dispersed in and bound by the polymer matrix, such that the blend forms a unified whole. The blend may be obtained by combining the component materials using any melt-mixing method or by mixing components other than matrix polymer with monomers of the polymer matrix and then polymerizing the monomers. The component materials may be mixed to homogeneity using a melt-mixer such as a single or twin-screw extruder, blender, kneader, Banbury mixer, etc. to give a resin composition. Part of the materials may be mixed in a melt-mixer, and the rest of the materials may then be added and further melt-mixed until homogeneous. The sequence of mixing in the manufacture of the thermally conductive polymer composition of this invention may be such that individual components may be melted in one shot, or the filler and/or other components may be fed from a side feeder, and the like, as will be understood by those skilled in the art.

Adhesive Component

Useful adhesive components used in the invention as an interface between the stator core and the over-molded insulating layer of the thermally conductive polymer composition include compounds capable of adhering to both the surface of the stator core and the housing of thermally conductive polymer composition. Examples include various compounds based on silane, titanate, zirconate, aluminate and zircoaluminate.

Useful titanium based compounds include, but are not limited to, monoalkoxy titanates, such as, isopropyl tri(N-ethylaminoethylamino) titanate, isopropyl tri-isostearoyl titanate and titanium di(dioctylpyrophosphate) oxyacetate; coordinate titanates, such as, tetraisopropyl di(dioctylphosphito) titanate; and neoalkoxy titanates, such as, neoalkoxy tris (dodecanoyl) benzenes sulfonyl zirconate, neoalkoxy tri(p-N-(beta-aminoethyl)aminophenyl)titanate. Other types include chelate, quaternary and cycloheteroatom titanates.

Useful zirconium based compounds include, but are not limited to, neoalkoxy zirconates, such as, neoalkoxy trisneodecanoyl zirconate, neoalkoxy tris(dodecanoyl) benzene sulfonyl zirconate, neoalkoxy tris(m-aminophenyl) zirconate, ammonium zirconium carbonate and zirconium propionate.

Useful silicon based compounds include a wide variety of silanes. One type of useful silane is represented by the formula $$R_{4-n}SiK_n \quad \text{(I)}$$

wherein R is an alkyl or aryl group, or a functional group represented by the formula $$C_xH_{2x}Y \quad \text{(II)}$$

wherein x is from 0 to 20 and Y is selected from the group consisting of amino, amido, hydroxy, alkoxy, halo, mercapto, carboxy, acyl, vinyl, allyl, styryl, epoxy, isocyanato, glycidoxy and acryloxy groups. K is a hydrolyzable group, such as, alkoxy (e.g., methoxy, ethoxy, and the like), phenoxy, acetoxy, and the like, or halogen (e.g., chlorine); and n is 1, 2, 3 or 4, and preferably n is 3.

The adhesive components represented by formula (I) include halosilanes, aminoalkoxysilanes, aminophenylsilanes, phenylsilanes, heterocyclic silanes, N-heterocyclic silanes, acrylic silanes and mercapto silanes. Mixtures of two or more silanes also are useful. In one embodiment K is OR wherein R is an alkyl group containing up to about 5 carbon atoms or an aryl group containing up to about 8 carbon atoms. In other embodiments x is an integer from 0 to 10 and more often from 1 to about 5.

The adhesive component can be an epoxy silane represented by the formula III.

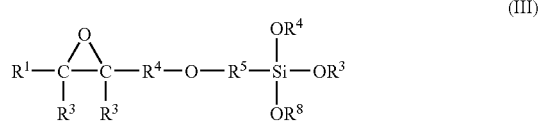

(III)

wherein: $R^1$, $R^2$ and $R^3$ are independently hydrogen or hydrocarbon groups; $R^4$ and $R^5$ are independently alkylene or alkylidene groups; and $R^6$, $R^7$ and $R^8$ are independently hydrocarbon groups. The hydrocarbon groups preferably contain 1 to about 10 carbon atoms, more preferably 1 to about 6 carbon atoms, more preferably 1 to about 4 carbon atoms. These hydrocarbon groups are preferably alkyl. The alkylene or alkylidene groups R4 and R5 preferably contain from 1 to about 10 carbon atoms, more preferably 1 to about 6 carbon atoms, more preferably 1 to about 4 carbon atoms, more preferably 1 or 2 carbon atoms. The alkylene and alkylidene groups can be methylene, ethylene, propylene, and the like.

The adhesive component can also be an acrylic silane represented by the formula IV.

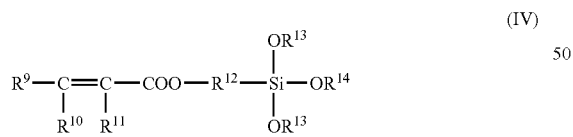

(IV)

wherein: $R^9$, $R^{10}$ and $R^{11}$ are independently hydrogen or hydrocarbon groups; $R^{12}$ is an alkylene or alkylidene group; and $R^{13}$, $R^{14}$ and $R^{15}$ are independently hydrocarbon groups. The hydrocarbon groups preferably contain 1 to about 10 carbon atoms, more preferably 1 to about 6 carbon atoms, more preferably 1 to about 4 carbon atoms. These hydrocarbon groups are preferably alkyl (e.g., methyl, ethyl, propyl, and the like). The alkylene and alkylidene groups preferably contain from 1 to about 10 carbon atoms, more preferably 1 to about 6 carbon atoms, more preferably 1 to about 4 carbon atoms. The alkylene groups include methylene, ethylene, propylene, and the like The adhesive component additionally can be an amino silane represented by the formula V

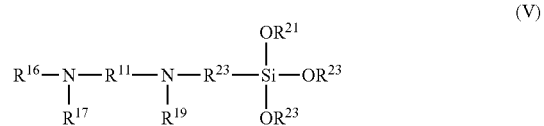

(V)

wherein: $R^{16}$, $R^{17}$ and $R^{19}$ are independently hydrogen or hydrocarbon groups; $R^{18}$ and $R^{20}$ are independently alkylene or alkylidene groups; $R^{21}$, $R^{22}$ and $R^{23}$ are independently hydrocarbon groups. The hydrocarbon groups preferably contain 1 to about 10 carbon atoms, more preferably 1 to about 6 carbon atoms, more preferably 1 to about 4 carbon atoms. These hydrocarbon groups are preferably alkyl (e.g., methyl, ethyl, propyl, and the like). The alkylene and alkylidene groups preferably contain from 1 to about 10 carbon atoms, more preferably 1 to about 6 carbon atoms, more preferably 1 to about 4 carbon atoms. The alkylene groups include methylene, ethylene, propylene, and the like.

Mercapto silane adhesive components can be represented by the formula VI

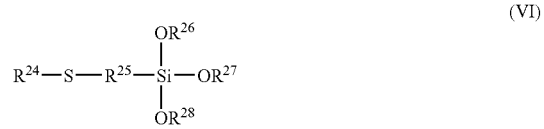

(VI)

wherein $R^{24}$ is hydrogen or a hydrocarbon group; $R^{25}$ is an alkylene or alkylidene group; and $R^{26}$, $R^{27}$ and $R^{28}$ are independently hydrocarbon groups. The hydrocarbon groups preferably contain 1 to about 10 carbon atoms, more preferably 1 to about 6 carbon atoms, more preferably 1 to about 4 carbon atoms. These hydrocarbon groups are preferably alkyl (e.g., methyl, ethyl, propyl, and the like). The alkylene and alkylidene groups preferably contain from 1 to about 10 carbon atoms, more preferably 1 to about 6 carbon atoms, more preferably 1 to about 4 carbon atoms. These groups are preferably alkylene (e.g., methylene, ethylene, propylene, and the like).

Vinyl adhesive components can be represented by the formula VII

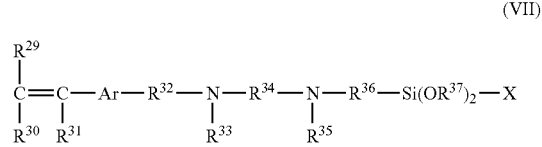

(VII)

wherein: $R^{29}$, $R^{30}$, $R^{31}$, $R^{33}$ and $R^{37}$ are independently hydrogen or hydrocarbon groups; $R^{32}$, $R^{34}$ and $R^{36}$ are independently alkylene or alkylidene groups; each $R^{37}$ is independently a hydrocarbon group; Ar is an aromatic group; and X is a halogen. The hydrocarbon groups preferably contain 1 to about 10 carbon atoms, more preferably 1 to about 6 carbon atoms, more preferably 1 to about 4 carbon atoms. The hydrocarbon groups are preferably alkyl (e.g., methyl, ethyl, propyl, and the like). The alkylene and alkylidene groups preferably contain from 1 to about 10 carbon atoms, more preferably 1 to about 6 carbon atoms, more preferably 1 to about 4 carbon atoms. These groups are preferably alkylene (e.g., methylene, ethylene, propylene, and the like). The aromatic group Ar can be mononuclear (e.g., phenylene) or polynuclear (e.g., naphthylene) with the mononuclear groups and especially phenylene being preferred. The halogen, X, is preferably chlorine or bromine, more preferably chlorine.

The adhesive component can be a bis-silane represented by the formula VIII

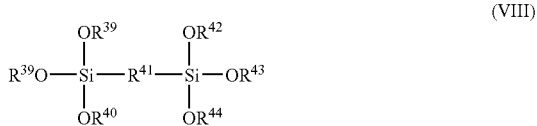

(VIII)

wherein $R^{38}$, $R^{39}$, $R^{40}$, $R^{42}$, $R^{43}$ and $R^{44}$ are independently hydrocarbon groups; $R^{41}$ is an alkylene or alkylidene group. The hydrocarbon groups preferably contain 1 to about 10 carbon atoms, more preferably 1 to about 6 carbon atoms, more preferably 1 to about 4 carbon atoms. These hydrocarbon groups are preferably alkyl (e.g., methyl, ethyl, propyl, and the like). The alkylene and alkylidene group preferably contains from 1 to about 10 carbon atoms, more preferably 1 to about 6 carbon atoms, more preferably 1 to about 4 carbon atoms. $R^{41}$ group is preferably alkylene (e.g., methylene, ethylene, propylene, and the like).

Useful adhesive components of zircoaluminate compounds include, but are not limited to, compounds presented by the formula IX.

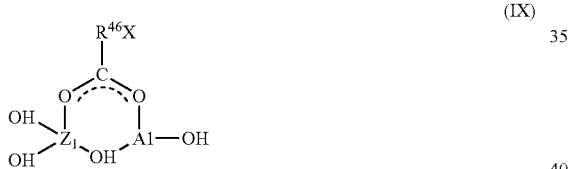

(IX)

wherein $R^{45}$ is an alkylene or alkylidene group. The alkylene and alkylidene groups preferably contain from 1 to about 10 carbon atoms, more preferably 1 to about 6 carbon atoms, more preferably 1 to about 4 carbon atoms. The alkylene groups include methylene, ethylene, propylene, and the like. X is groups which can react with a group of base polymers of the composition b). Examples are $NH_2$, COOH and SH.

The adhesive components can be coated on the stator core by, but are not limited to, dipping, spraying and spin coating method. In the coating process, the adhesive components may be dissolved into a medium, such as, methanol, ethanol and isopropyl alcohol to allow for application of a uniform coat on the metal surface of the stator core. After coating, the adhesive components on the stator core may be dried to enhance curing the adhesive components.

Another example of utilizing the adhesive components is to blend the adhesive components with the thermally conductive polymer compositions and then over-molding with the blend over the stator core.

The surface of the stator core can be modified by oxidation or hydroxylation to improve reactivity with the adhesive components as will be understood by those skilled in the art.

The process for forming a stator assembly of this invention of a stator core, which comprises laminated electromagnetic steel sheets and wire wound coils, comprises over-molding the stator core with an insulator covering (b) between the stator core and the wire wound coils and applying an adhesive component (c) between the stator core and the over-molded insulator covering (b).

When the stator core is coated with the adhesive components prior to over-molding process, the thermally conductive polymer composition can be shaped into an insulator which will cover multiple poles of the stator core using an injection or insert molding process after the stator core is treated with the treatment on the stator core with adhesive component (c).

In the insert molding process, the stator is placed within the mold for the insulator. The molten polymer composition is injected into the mold so that the composition covers the multiple poles of the stator core where wire is wound to form a coil after this over-molding process.

The thermally-conductive insulator covering for the stator of the present invention has many advantageous features over conventional assemblies. One of advantages is, the housing has improved thermal conductivity properties. Referring to FIG. 1, these heat transfer properties allow for the removal of heat from the coil 2 wherein heat is generated and builds up quickly from the operation of the motor or generator. The over-molded insulator efficiently transfers heat from the coil to the metal stator core and prevents overheating of the motor or generator.

In this manner, it is important to transfer heat between the stator core (a) and the thermally conductive polymer composition (b) with the adhesive component (c) providing improved heat transfer.

It is appreciated by those skilled in the art that various changes and modifications can be made to the description and illustrated embodiments herein without departing from the spirit of the present invention. All such modifications and changes are intended to be covered by the appended claims.

The following Examples illustrate the invention.

EXAMPLES

The effectiveness of the adhesive components in the interface between the stator core and thermally conductive polymer composition for enhancing heat transfer is demonstrated by the following:

A thermally conductive polymer composition was prepared by melt blending the ingredients shown in Table 1 in a kneading extruder at temperatures of about 330-360° C. Upon exiting the extruder, the composition was cooled and pelletized. The resulting composition was injection molded into test pieces having dimensions 100 mm×100 mm×3.2 mm for thermal conductivity measurements. Thermal conductivity of the composition was measured by Hot Disk Method and the results are shown in Table 1.

40 mm×23 mm×8 mm size SUS304 (stainless steel) block was dipped in Primer 1 which comprises organosilane mixture, that is supplied as APZ-6601 from Dow Corning Toray Co., Ltd, and dried at 100° C. for 10 minutes.

The SUS block coated with organosilane for Example 1 and non-coated SUS block for Comparative Example 1 were over-molded by injection molding with the thermally conductive polymer composition resulting in a 1 mm thick over-mold layer. Thus, the dimensions of the over-molded blocks were 42 mm×25 mm×10 mm.

Figure 4:
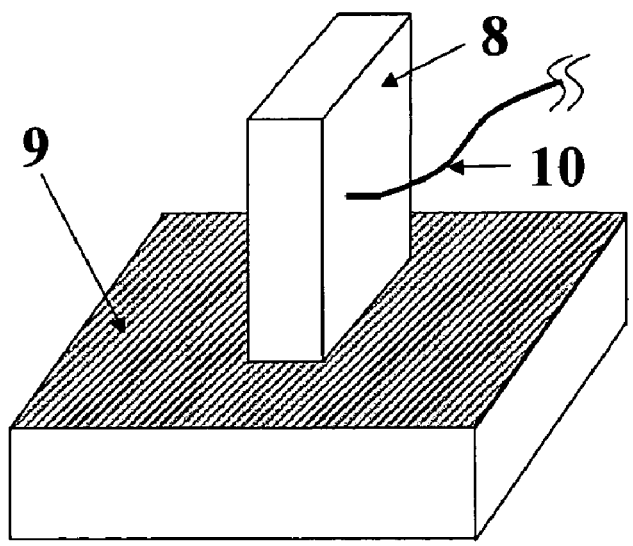
FIG. 4 is a view of the experiment to measure the effect of the adhesive component on heat flow from the heat source to a metal core through the polymer composition over-mold of the stator core.
Figure 5:
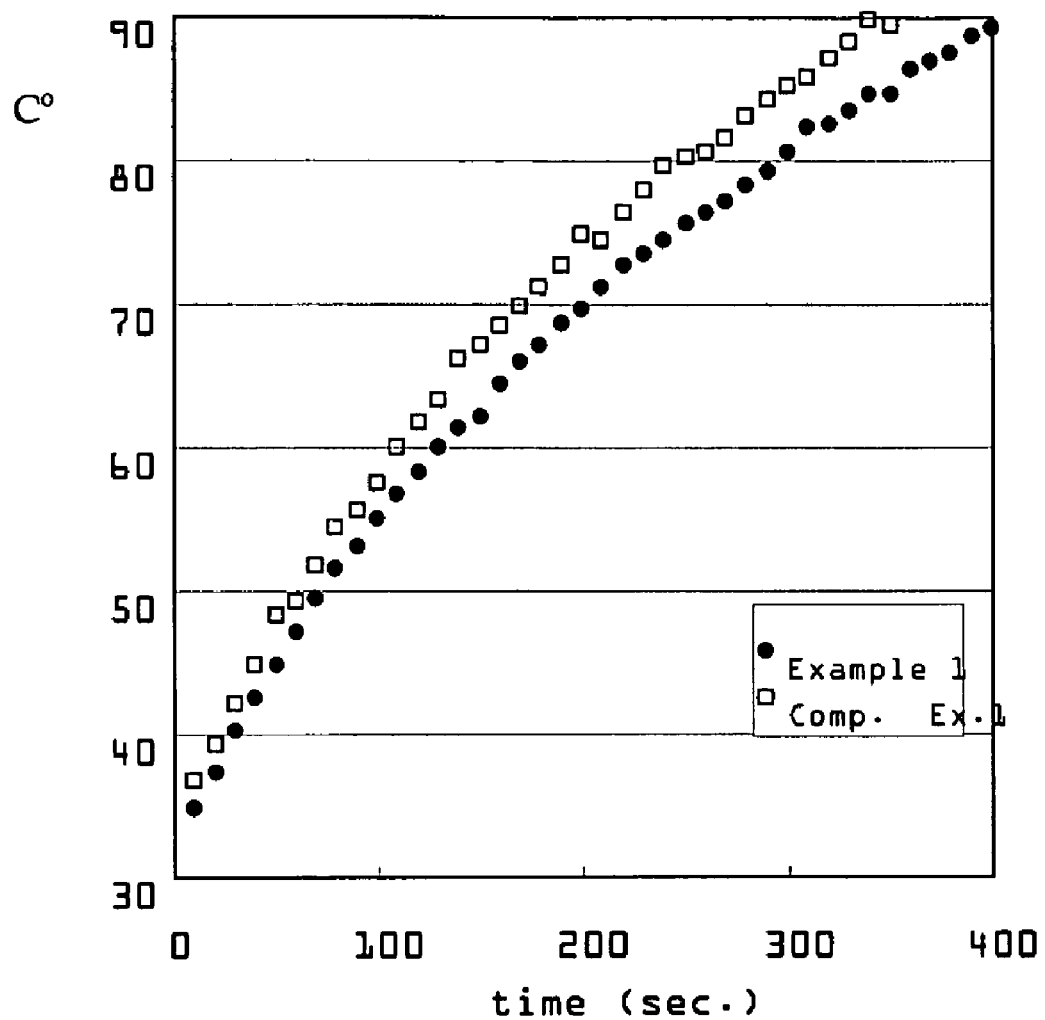
FIG. 5 shows the temperature rise of the metal stator core when the over-molded core is exposed to a heat source.

After incubation at 23° C. for a day (24 hours), the over-molded blocks 8 (see FIG. 4) were put on the hot plate 9 which was controlled to keep its surface temperature at 200° C. Rise of temperature of the inner SUS304 was monitored by the thermocouple probe 10 inserted into the core SUS304, and the temperature was recorded by 10 seconds interval. As seen from FIG. 5, the temperature of SUS304 over-molded and having the organosilane adhesive component (Example 1, the invention), rose faster than that of the over-molded without any adhesive component (Comparative Example 1). This result indicates that the adhesive component enhances the heat transfer between over-molded thermally conductive polymer composition and inner SUS304 metal block.

This means a motor or generator having a stator assembly comprising:

(a) a stator core made of laminated electromagnetic steel sheets and containing wire wound coils;

(b) an over-molded insulator covering the stator core; wherein the over-molded insulator comprises a thermally conductive polymer composition having a thermal conductivity of at least about 0.6 W/mK; and (c) an adhesive component interfaced between the stator core a) and the over-molded insulator (b) can release heat generated in the coil efficiently.

The following ingredients for Composition 1 are shown in Table 1 following:

HTN: ZytelHTN® 501 supplied by E.I. du Pont de Nemours and Company.

Modified-EPDM: EPDM (ethylene/propylene/diene polyolefin) grafted with maleic anhydride supplied by E.I. du Pont de Nemours and Company.

Talc: HTP2c supplied by Tomoe Kogyo.

TABLE 1

|  | Composition 1 |
| --- | --- |
| HTN (vol. %) | 70 |
| Modified-EPDM (vol. %) | 5 |
| Talc (vol. %) | 25 |
| Thermal Conductivity (W/mK) | 0.7 |

What is claimed is:

1. A stator assembly comprising:
   (a) a stator core comprising laminated electromagnetic steel sheets and further comprising wire wound coils;
   (b) an over-molded insulator covering the stator core and being positioned between the stator core and the wire wound coils; wherein the over-molded insulator comprises a thermally conductive polymer composition having a thermal conductivity of at least about 0.6 W/mK; and
   (c) an adhesive component interfaced between the stator core (a) and the over-molded insulator (b);
   wherein the thermally conductive polymer composition comprises a base polymer and a filler material; and
   wherein the base polymer is selected from the group consisting of thermoplastic polymers and thermosetting polymers, and the polymer contains groups that are reactive with the adhesive component (c).

2. The stator assembly of claim 1 wherein the thermally conductive polymer composition comprises a thermoplastic polymer and a toughening agent.

3. The stator assembly of claim 1 wherein the adhesive component is a primer coated on the stator core (a).

4. The stator assembly of claim 3 wherein the primer comprises a coupling agent selected from the group consisting of silane, titanate, zirconate, aluminate and zircoaluminate.

5. The stator assembly of claim 4 wherein the thermally conductive polymer composition comprises thermoplastic polymers having groups which can react with the coupling agents of the primer.

6. A motor comprising the stator assembly of claim 1.

7. A generator comprising the stator assembly of claim 1.

* * * * *